United States Patent [19]
Li et al.

[11] Patent Number: 6,065,678
[45] Date of Patent: May 23, 2000

[54] BAR CODE SCANNER HAVING A FOCUSING SYSTEM

[75] Inventors: Yajun Li, Oakdale; Joseph Katz, Stony Brook, both of N.Y.

[73] Assignee: Symbol Technologies, Inc., Holtsville, N.Y.

[21] Appl. No.: 09/192,032

[22] Filed: Nov. 13, 1998

Related U.S. Application Data

[62] Division of application No. 08/591,809, Jan. 25, 1996, Pat. No. 5,859,418.

[51] Int. Cl.[7] .................................................. G06K 7/10
[52] U.S. Cl. ............................. 235/462.46; 235/462.25
[58] Field of Search ..................... 235/462.02, 462.01, 235/472.01, 472.03, 462.48, 462.32, 472.02

[56] References Cited

U.S. PATENT DOCUMENTS

| | | | |
|---|---|---|---|
| 4,251,798 | 2/1981 | Swartz et al. | 340/462 |
| 4,369,361 | 1/1983 | Swartz et al. | 235/462 |
| 4,387,297 | 6/1983 | Swartz et al. | 235/462 |
| 4,409,470 | 10/1983 | Shepard et al. | 235/472 |
| 4,760,248 | 7/1988 | Swartz et al. | 235/472 |
| 4,896,026 | 1/1990 | Krichever et al. | 235/472 |
| 5,243,655 | 9/1993 | Wang | 380/51 |
| 5,304,786 | 4/1994 | Pavlidis et al. | 235/462 |
| 5,319,182 | 6/1994 | Havens et al. | 235/462 |
| 5,357,091 | 10/1994 | Ozawa et al. | 235/380 |
| 5,406,060 | 4/1995 | Gitin | 235/462 |
| 5,430,286 | 7/1995 | Hammond, Jr. et al. | 235/472 |
| 5,446,272 | 8/1995 | Barkan | 235/462 |
| 5,449,892 | 9/1995 | Yamada | 235/462 |
| 5,541,397 | 7/1996 | Walts | 235/472 |
| 5,576,531 | 11/1996 | Murphy | 235/472 |
| 5,585,615 | 12/1996 | Iwanami et al. | 235/472 |
| 5,585,616 | 12/1996 | Roxby et al. | 235/472 |
| 5,589,680 | 12/1996 | Swartz et al. | 235/472 |
| 5,600,116 | 2/1997 | Seo et al. | 235/455 |
| 5,600,121 | 2/1997 | Kahn et al. | 235/462.46 |
| 5,623,137 | 4/1997 | Powers et al. | 235/462 |
| 5,736,726 | 4/1998 | VanHorn et al. | 235/472 |
| 5,793,031 | 8/1998 | Tani et al. | 235/462 |
| 5,859,418 | 1/1999 | Li et al. | 235/472 |

FOREIGN PATENT DOCUMENTS

| | | | |
|---|---|---|---|
| 61-80471 | 4/1986 | Japan | 235/462 |

OTHER PUBLICATIONS

IEEE Journal of Solid–State Circuits, vol. 25, No. 1, Feb. 1990, pp. 312–315 300–MH2 CMOS Voltage–Controlled Ring Oscillator by S.K. Enam & Asad A. Abidi.

*Primary Examiner*—Thien M. Le

[57] ABSTRACT

A CCD based bar code scanner having a focusing system for assisting an operator in determining a proper relative position between the scanner and the bar code. The scanner also includes an illumination system for illuminating the bar code, a collection system for detecting the light reflected from the illuminated bar code and a processor for processing the detected signals.

16 Claims, 12 Drawing Sheets

FIG.15

BAR CODE SCANNER HAVING A FOCUSING SYSTEM

REFERENCE TO RELATED APPLICATIONS

This application a division of U.S. patent application Ser. No. 08/591,809 filed Jan. 25, 1996, now U.S. Pat. No. 5,859,418.

BACKGROUND OF THE INVENTION

1. Field of the Invention

The present invention relates generally to bar code scanners and more particularly pertains to CCD-based bar code scanners and to illumination apparatus and to methods of illumination.

2. Description of the Related Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light reflecting characteristics. The readers and scanning systems electro-optically transform the graphic indicia into electrical signals, which are decoded into alphanumeric characters that are intended to be descriptive of the article or some characteristic thereof. Such characters are typically represented in digital form and utilized as an input to a data processing system for applications in point-of-sale processing. Inventory control, and the like scanning systems of this general type have been disclosed, for example, in U.S. Pat. Nos. 4,251,798; 4,369,361; 4,387,297, 4,409,470; 4,760,248; and 4,896,026, all of which have been assigned to the same assignee as the instant application.

As disclosed in some of the above patents, one embodiment of such a scanning system resides, inter alia, in a hand-held, portable scanning head supported by a user, which is configured to allow the user to aim the head, and more particularly, a light beam, at a target and a symbol to be read.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, element arrangements are concatenated together to form the complete bar code symbol, with each character of the message being represented by its own corresponding group of elements. In some symbologies a unique "start" and "stop"character is used to indicate where the bar code begins and ends. A number of different bar code symbologies exist. These symbologies include UPC/EAN, Code 39, Code 128, Codabar, and Interleaved 2 of 5.

A further known symbology is known as two-dimensional (2D) symbology and is discussed in detail in commonly-assigned U.S. Pat. Nos. 5,243,655 and 5,304,786, which are incorporated herein by this reference thereto. Briefly, that symbology involves a variable number of component symbols or "codewords" per row of a nonvolatile electro-optical read-only memory imprinted on a substrate. Codewords in alternating rows are selected from mutually exclusive subsets of a mark pattern, the subsets being defined in terms of particular values of a discriminator function which is illustrated in the referenced patents as being a function of the widths of bars and spaces in a given codeword.

In the scanning systems known in the art, the light beam is directed by a lens or similar optical components along a light path toward a target that includes a bar code symbol on the surface. The scanning systems function by repetitively scanning the light beam in a line or series of lines across the symbol. The scanning component may either sweep the beam spot across the symbol and trace a scan line across the past the symbol, or scan the field of view of the scanner, or do both.

Scanning systems also include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric character so represented.

The decoding process in known scanning systems usually works in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Decoding in 2D symbology is discussed particularly and shown in various flow charts set forth in the 2D symbology patents incorporated by reference and above identified.

Another type of bar code reader is one which incorporates a detector based upon charge coupled device (CCD) technology. CCDs are an array of many detectors. The entire symbol is flooded with light from the reader or ambient light, and each CCD detector is sequentially read out to determine the presence of a bar or a space. Such readers are light-weight and easy to use, but require substantially direct contact or placement of the reader on the symbol to enable the symbol to be properly read. Such physical contact of the reader with the symbol is a preferred mode of operation for many applications, or as a matter of personal preference by the user. However, where contact or near contact reading is not required or desired, the prior art CCD based bar code readers lack in proper illumination mechanisms.

It is an object of the present invention to provide a CCD-based bar code scanner with improved means fo illuminating the target bar code.

SUMMARY OF THE INVENTION

In accordance with this and other objects, provided is an optical funnel for bar code scanners with a support member having an aperture circumferentially disposed with respect to an optical axis of the scanner, a plurality of radiant energy sources supported by the support member in circumferential disposition with respect to the optical axis of the scanner and a shroud member disposed in circumscribing relation to the radiant energy sources and having a central aperture in circumferential disposition with respect to the optical axis of the scanner, the shroud member having interior surface adapted for optical modification of radiant energy generated by the radiant energy sources. In one embodiment, the interior surface of the shroud member is adapted to diffuse radiant energy generated by the radiant energy sources and the assembly includes a ring-shaped member disposed circumferentially of the optical axis of the scanner, radially interiorly of the radiant energy sources, and adapted to diffuse radiant energy generated by the radiant energy sources. In another embodiment, the interior surface of the shroud member is adapted to reflect radiant energy generated by the radiant energy sources and the assembly includes a radiant energy reflective member having an aperture circumferentially disposed with respect to the optical axis of the scanner and in optical communication with the reflective interior surface of the shroud member.

In another aspect, the invention provides a support member having an aperture circumferentially disposed with respect to an optical axis of the scanner and a plurality of radiant energy sources supported by the support member in circumferential disposition with respect to the optical axis of the scanner and having respective transmitting axes in intersecting relation to the optical axis of the scanner.

BRIEF DESCRIPTION OF THE DRAWINGS

The foregoing objects and advantages of the present invention may be more readily understood by one skilled in the art with reference being had to the following detailed description of preferred embodiments thereof, taken in conjunction with the accompanying drawings wherein like elements are designated by identical reference numerals throughout the several views, and in which.

DETAILED DESCRIPTION OF PREFERRED EMBODIMENTS AND PRACTICES

Figure 1:
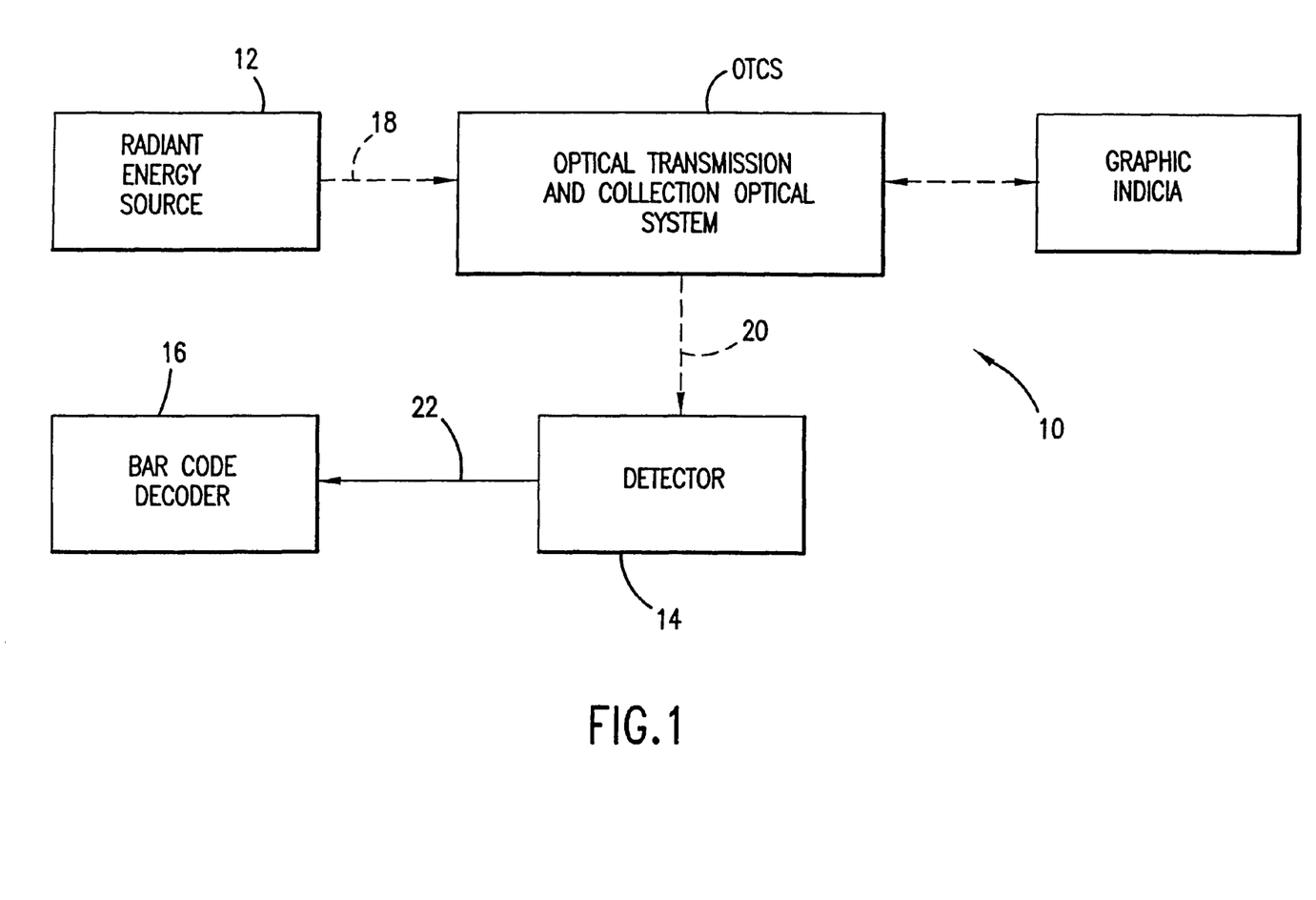
FIG. 1 is a general functional block diagram of components of a scanner in accordance with the invention.

Referring to FIG. 1, scanner 10 includes radiant energy source 12, an optical transmission and collection system (OTCS) discussed below, radiant energy detector 14 and bar code decoder 16. Source 12 and detector 14 communicate with the OTCS (hereinafter, the "optical system") as indicated by optical paths 18 and 20 and lines 22 furnish detector output signals to decoder 16. The optical system has as its object a bar code or the like, indicated in FIG. 1 as GRAPHIC INDICIA.

Source 12 may be constituted by a light-emitting diode (LED) (shown in FIG. 2 as 12a) or other known radiant energy source. Detector 14 preferably comprises a CCD array, but may be constituted by photocells or other known radiant energy detectors. Decoder 16 may be constituted by a microcomputer, programmed as set forth in the patents above referenced in the cited prior art patents, to decode the symbology of the bar code being addressed by the scanner.

Figure 2:
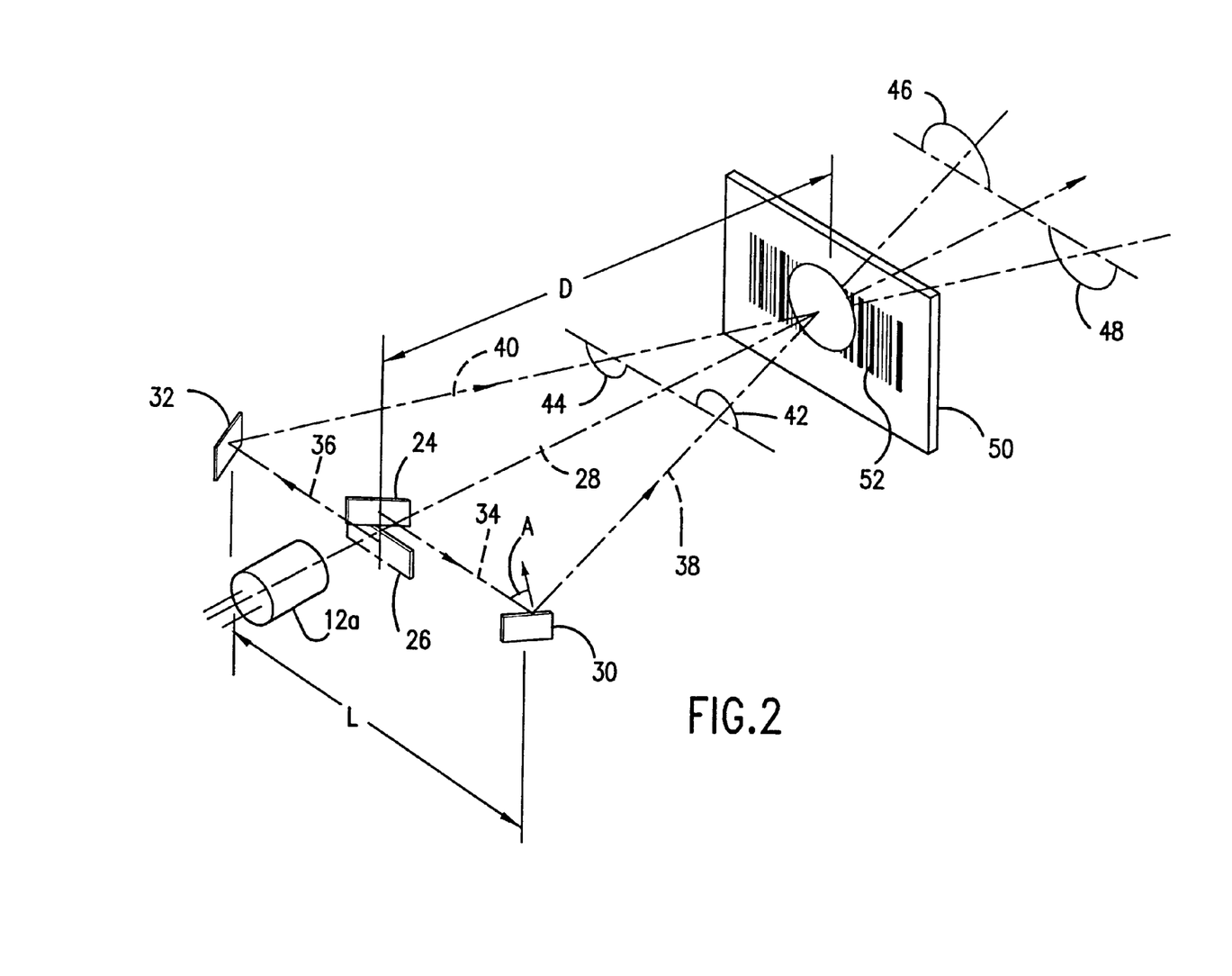
FIG. 2 shows a first embodiment of a focus portion of an optical system in accordance with the invention.

Turning to FIG. 2, the focus portion of the optical system has first and second mirrors 24 and 26, which are in registry with segments of the radiant energy issuing from LED 12a. In the illustrated arrangement, LED 12a provides an output beam which is circular in configuration and mirror 24 is in registry with the upper half-circle of the output beam and mirror 26 is in registry with the lower half-circle of the output beam. As is discussed hereinafter, the geometric configuration of the radiant energy source output beam is generally not of consequence in practicing the invention.

Mirrors 24 and 26 are fixedly disposed in the scanner, as is the radiant energy source 12a. Mirror 24 is disposed to reflect the LED upper half-circle output beam orthogonally of optical axis 28 onto mirror 30. Mirror 26 is disposed to reflect the LED lower half-circle output beam orthogonally of optical axis 28 onto mirror 32, i.e., oppositely of the energy reflected by mirror 24, the reflective paths 34 and 36 being in alignment orthogonally of optical axis 28 as viewed from above and each mirror having an angle of inclination (A) relative to alignment paths 34 and 36.

Further reflective paths 38 and 40, respectively of mirrors 30 and 32, will be seen to contain smaller (42, 44) and larger (46, 48) images of the half-circles as distance progresses along optical axis 28. At one location along the optical axis, however, the respective upper and lower half-circle images will be in planar registry, i.e., at target or object plane 50, which is the focal plane of the focus portion of the optical system. A bar code 52 resident in plane 50 will accordingly be in focus for a scan portion of the optical system as is discussed hereinafter.

The distance D between plane 50 and the centerlines of mirrors 24 and 26 is defined by the relationship:

$$D=(L/2)\tan(2A)$$

where L is the distance between the vertical centerlines of mirrors 30 and 32.

In use of the scanner of the invention with the optical system of FIG. 2, a user energizes LED 12a and directs its output beam, in segments per the focus portion above discussed, onto bar code 52. The user then displaces the scanner toward or away from the bar code until such time as the user finds the segments of the output beam to be in positional (common plane) registry, as above discussed, to replicate the geometric configuration of the originally-generated radiant energy beam output of LED 12a.

Figure 3:
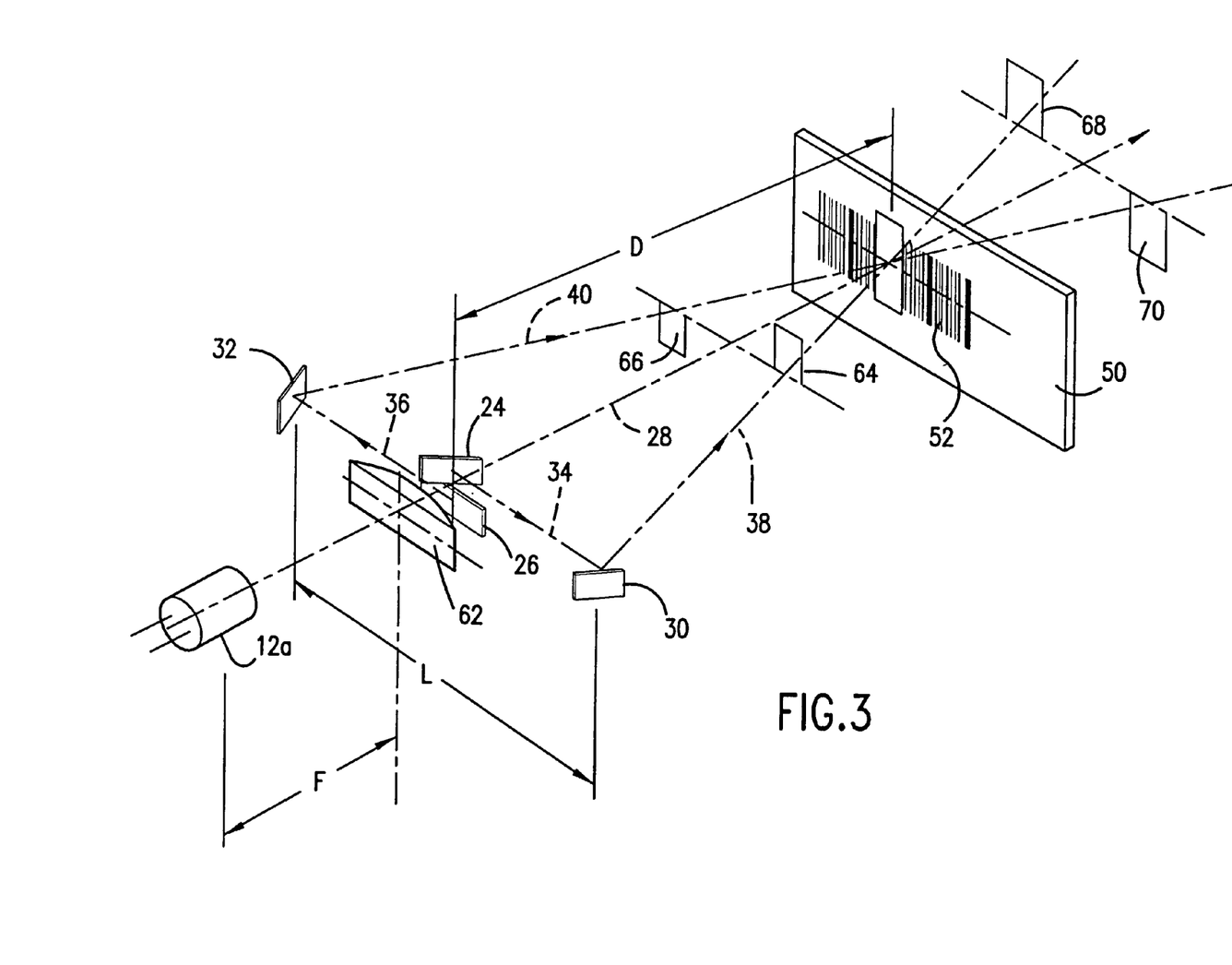
FIG. 3 shows a second embodiment of a focus portion of an optical system in accordance with the invention.

Turning to the embodiment of FIG. 3, components thereof in common with the FIG. 2 embodiment bear the same reference numerals and letters. An additional component is included, namely, cylindrical lens 62. LED 12a is disposed at the focal length (F) of lens 62 and the lens converts the circular output beam of LED 12a into a rectangular beam, which is applied to mirrors 24 and 26 in respective upper and lower half-rectangular segments. Reflective paths 38 and 40, respectively of mirrors 30 and 32, will be seen to contain smaller (64, 66) and larger (68, 70) images of the half-rectangles as distance progresses along optical axis 28. At one location along the optical axis, however, the respective upper and lower half-rectangle images will be in planar registry, i.e., at target or object plane 50, which is the focal plane of the focus portion of the optical system. A bar code 52 resident in plane 50 will accordingly be in focus for the scan portion of the optical system.

As noted above, the geometric configuration of the output beam of radiant energy source 12 is generally not of consequence. However, advantage attends the rectangularizing of the output beam. Thus, when the user moves the scanner along the optical axis to register the half segments, the user can also observe bar code alignment, e.g., horizontal disposition thereof, in that the bar code is typically itself of rectangular configuration.

Figure 4:
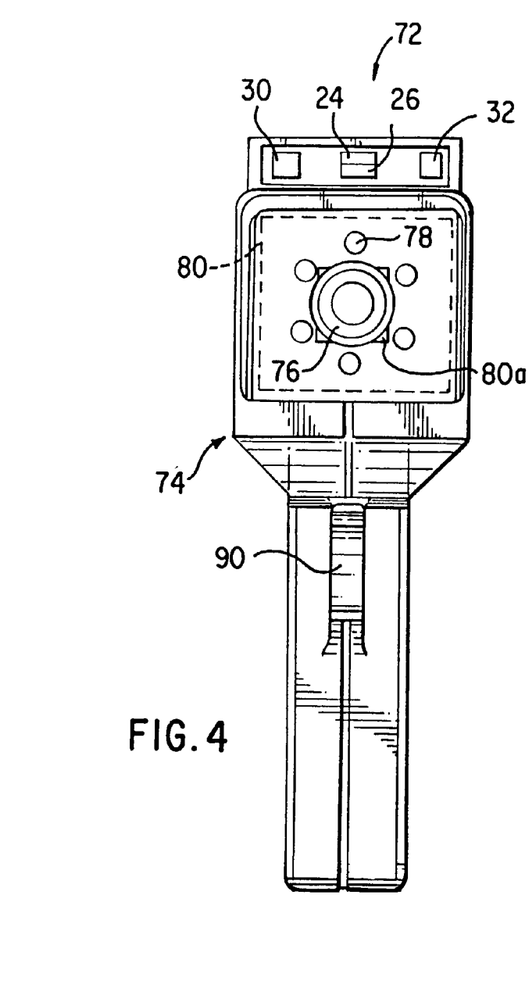
FIG. 4 is a front elevation of a hand-held scanner arrangement in which the focusing system of the invention is embodied.
Figure 5:
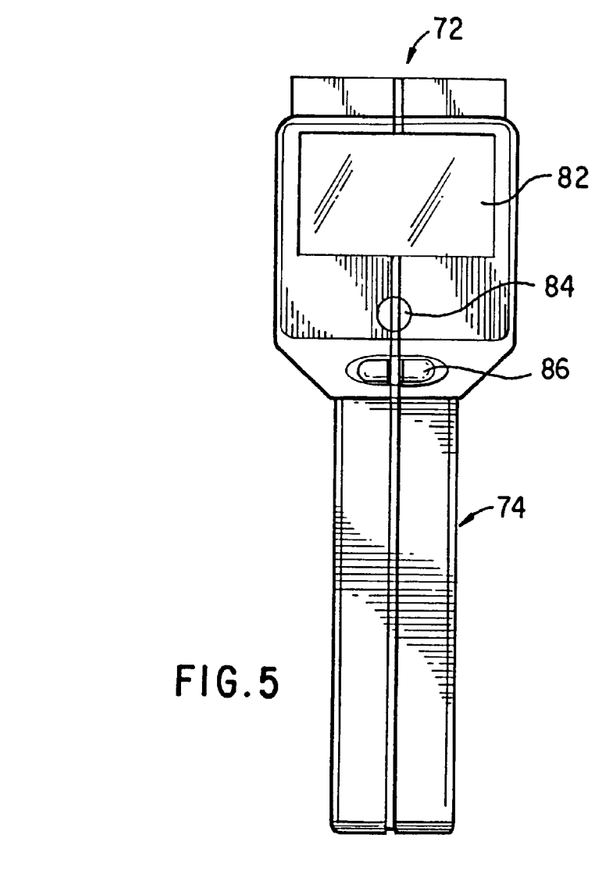
FIG. 5 is a rear elevation of the FIG. 5 scanner.
Figure 6:
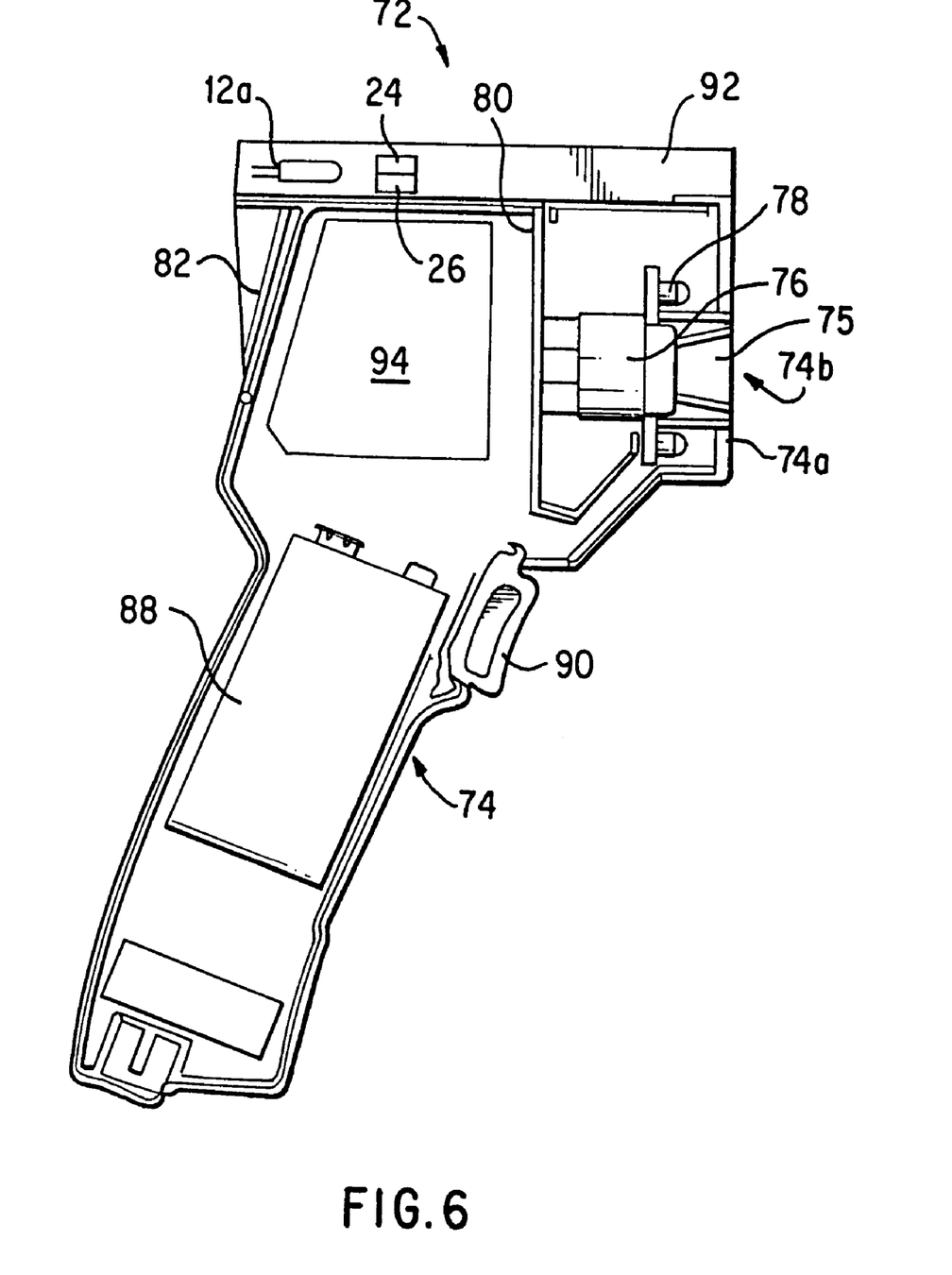
FIG. 6 is a pictorial view of interior contents of the FIG. 5 scanner.

FIGS. 4–6 illustrate a highly simplified embodiment of a bar code reader that may utilize the simplified focusing system of the invention. A reader may be implemented as a hand-held scanner 72, as illustrated, or a desk-top work station or stationery scanner. In a preferred embodiment, the arrangement is implemented in a housing 74, which may be of plastic and have separable housing halves with radiant energy exit port 74a, which may be termed an optical output funnel, and radiant energy entry port 74b, which is bounded by optical isolator 75 and may be termed an optical input funnel. Isolator 75 is an opaque member, tapering to lens 76, and serves to restrict the lens to receipt of projected radiant energy as modified by reflection thereof by the scanned bar code.

Scanner 72 is generally of the style disclosed in U.S. Pat. No. 4,760,248 issued to Swartz, et al., or in U.S. Pat. No. 4,896,026 assigned to Symbol Technologies, Inc., and also similar to the configuration of a bar code reader commercially available as part number LS 2000 from Symbol Technologies, Inc. Alternatively, or in addition, features of U.S. Pat. No. 4,387,297 issued to Swartz, et al. or U.S. Pat. No. 4,409,470 issued to Shepard, et al., both such patents assigned to Symbol Technologies, Inc., may be employed in constructing the bar code reader unit of FIG. 5. These U.S. Pat. Nos. 4,760,248, 4,896,026 and 4,409,470 are incorporated herein by reference.

Referring to FIGS. 4–6 in more detail, the segmented outgoing light beams are generated in scanner 72 and directed to impinge upon a bar code symbol disposed on a target a few inches from the front of housing 74. In a preferred embodiment, the reader unit is of a pistol-shape, i.e. having barrel and grip portions as illustrated. The focus portion of the OTCS is disposed in an uppermost cavity 92 and, as shown, the optical axis thereof extends in parallel with the barrel portion of housing 74. The various mirrors and LED thereof can be seen in FIGS. 4 and 6.

Lens 76 of the scan portion of the OTCS likewise has its optical axis disposed in parallel with the barrel portion of housing 74 and LEDs 78 are disposed circumferentially of lens 76. CCD array unit 80 includes an active portion 80(*a*) (FIG. 4) in registry with lens 76.

An LCD panel 82 permits visual communication of decoded symbology of scanned bar codes and other operational information as desired, for example, display of the bar code during focusing. Indicator 84 provides indications of successful scans as by issuing output light, beeping, or the like. Slider 86 is provided to control the level of excitation of LEDs 78. The scanner is powered by battery 88, disposed in the grip portion of housing 74. Pushbutton 90 is a two-stage switch actuator. In one ON position thereof, LED 12a is energized, i.e., to accomplish the focusing phase. In the other ON position of pushbutton 90, LEDs 78 are energized, i.e., to accomplish the scanning phase.

Printed circuit board 94 includes the various electronic circuitry of the scanner, particularly decoder 16 of FIG. 1, including a CPU suitably programmed for decoding of the symbology of the scanned bar code and for controlling operation of the scanner, as explained below in connection with FIG. 7.

The scanner is designed to be aimed at a bar code symbol by the user from a position in which the reader is spaced from the symbol, i.e., not touching the symbol or moving across the symbol. Typically, this type of hand-held bar code reader is specified to operate in the range of perhaps several inches.

The reader may also function as a portable computer terminal, and may include a keyboard, such as described in the previously noted U.S. Pat. No. 4,409,470.

Figure 7:
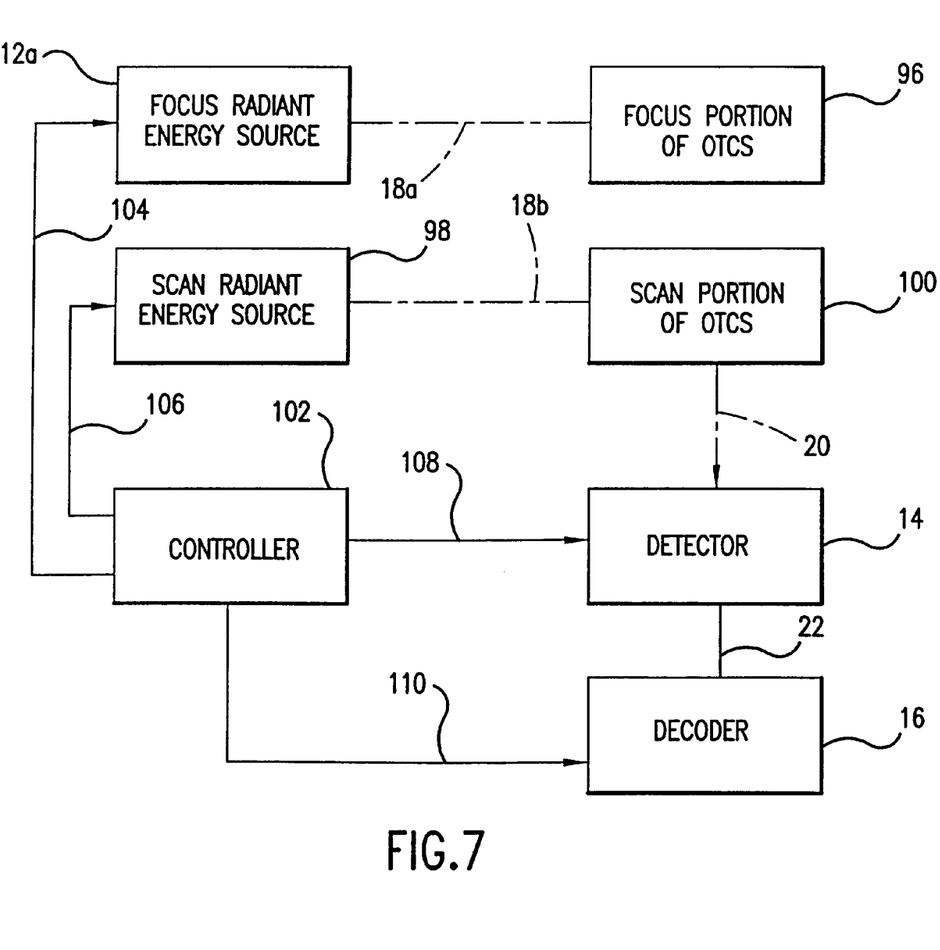
FIG. 7 is a general functional block diagram of components of the scanner of FIGS. 4–6.

Turning to FIG. 7, focus radiant energy source 12a communicates with focus portion of OTCS over optical path 18a and scan radiant energy source 98, comprised of LEDs 78 of FIGS. 4 and 6, communicates over optical path 18b with scan portion 100 of OTCS.

Controller 102 energizes source 12a over line 104, energizes source 98 over line 106, controls detector 14 over line 108 and controls decoder 16 over line 110. In terms of control sequence, source 12a is energized until focus is obtained. Then, source 98 is energized. Then, detector 14 is enabled to have its CCDs read out. Lastly, decoder 16 is enabled to decode the bar code symbology in accordance with detector 14 output signals on line 22.

Figure 8:
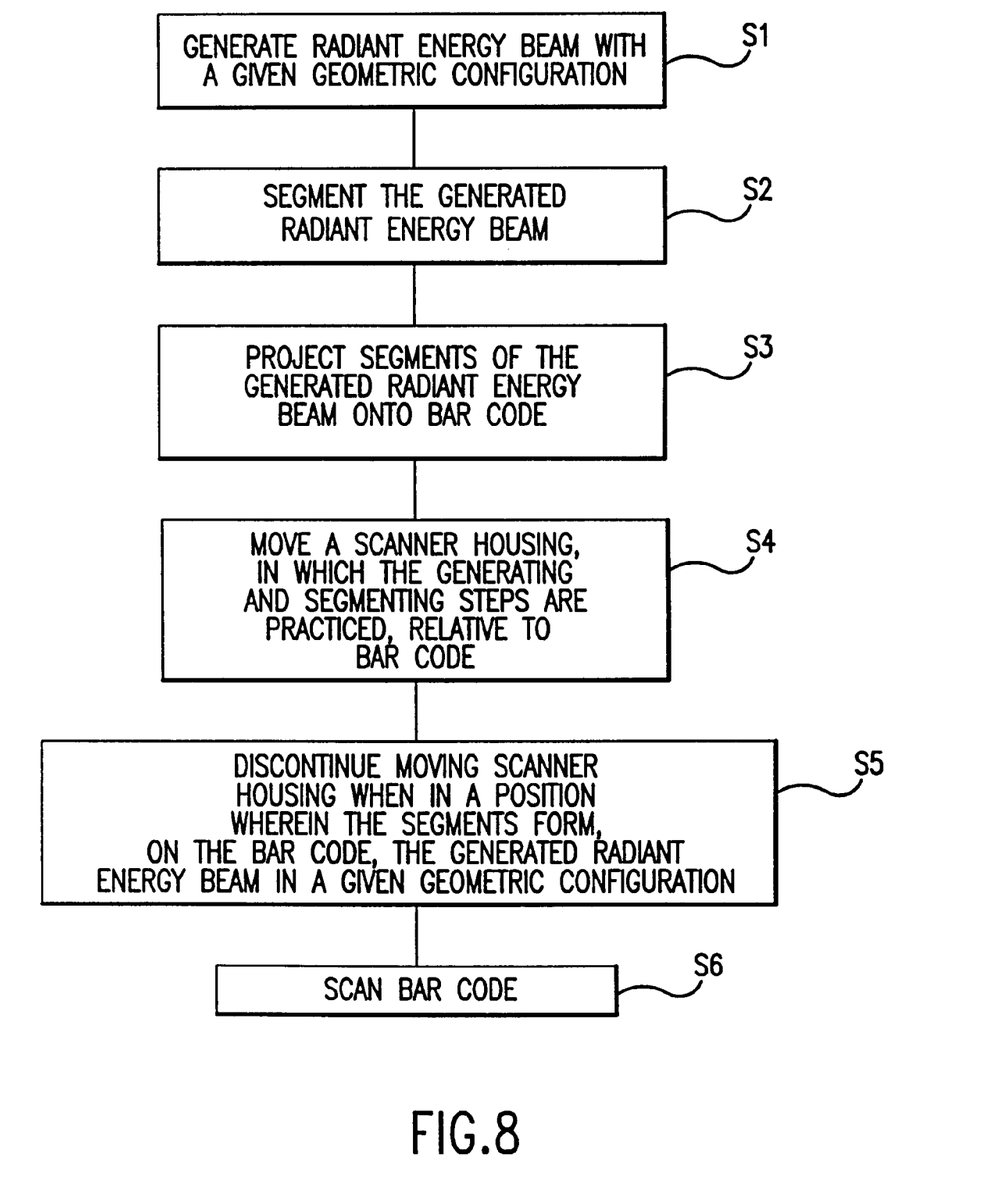
FIG. 8 is a flowchart of steps practiced in a first method afforded by the invention.

The steps of one method aspect of the invention are shown in the flow chart of FIG. 8.

In step S1, GENERATE RADIANT ENERGY BEAM WITH A GIVEN GEOMETRIC CONFIGURATION, the aforementioned circular or rectangular beam is generated.

In step S2, SEGMENT THE GENERATED RADIANT ENERGY BEAM, the generated beam is partitioned by mirrors 24 and 26 of FIGS. 2 and 3.

In step S3, PROJECT SEGMENTS OF THE GENERATED RADIANT ENERGY BEAM ONTO BAR CODE, mirrors 30 and 32 so provide.

In step S4, MOVE A SCANNER HOUSING, IN WHICH THE GENERATING AND SEGMENTING STEPS ARE PRACTICED, RELATIVE TO BAR CODE, housing 74 is advanced toward or moved backward from the bar code.

In step 5, DISCONTINUE MOVING SCANNER HOUSING WHEN IN A POSITION WHEREIN THE SEGMENTS FORM, ON THE BAR CODE, THE GENERATED RADIANT ENERGY BEAM IN GIVEN GEOMETRIC CONFIGURATION, the scanner housing is maintained stationary as the beam configuration is that of FIGS. 2 or 3 on plane 50.

In step S6, SCAN BAR CODE, an image of the in-focus bar code is supplied to CCD array active area 80*a*.

Figure 9:
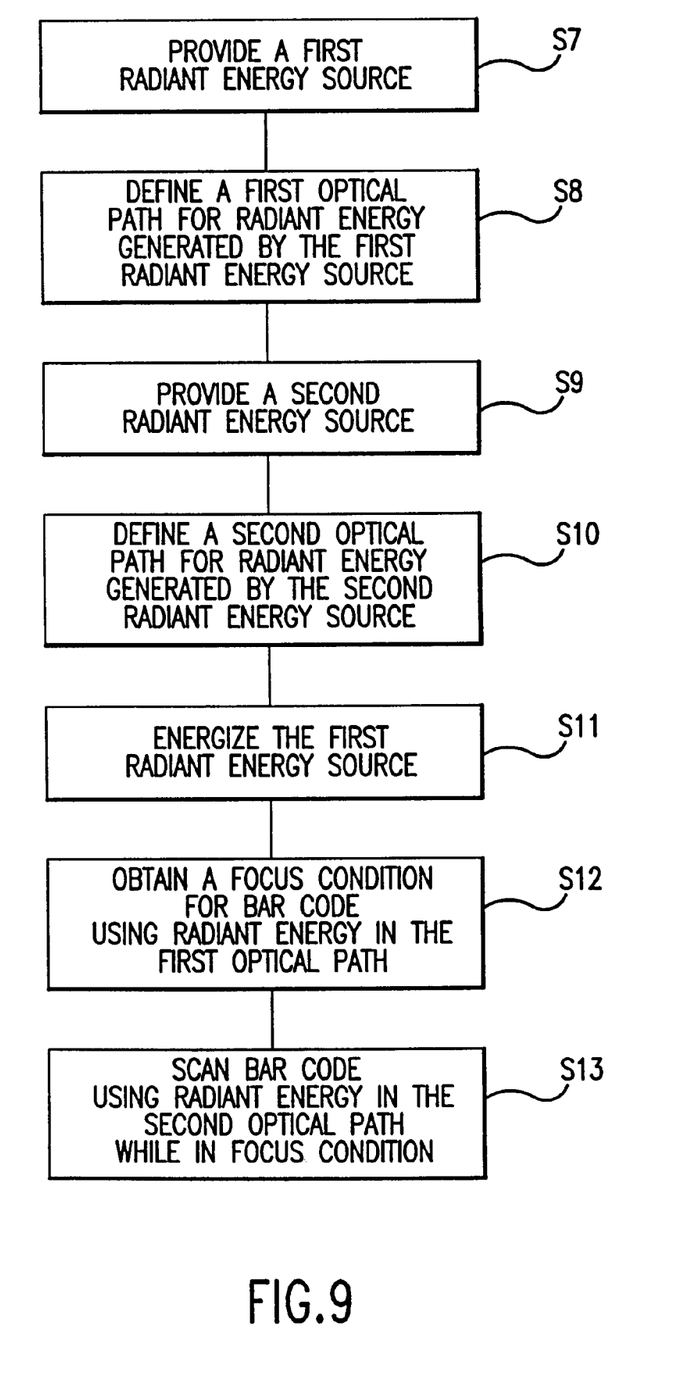
FIG. 9 is a flowchart of steps practiced in a second method afforded by the invention.

The steps of another method aspect of the invention are shown in the flow chart of FIG. 9.

In step S7, PROVIDE A FIRST RADIANT ENERGY SOURCE, LED 12*a* is provided.

In step S8, DEFINE A FIRST OPTICAL PATH FOR RADIANT ENERGY GENERATED BY THE FIRST RADIANT ENERGY SOURCE, an optical path for focusing purposes is defined, e.g., as by mirrors 24, 26, 30 and 32.

In step S9, PROVIDE A SECOND RADIANT ENERGY SOURCE, LEDs 78 are provided.

In step S10, DEFINE A SECOND OPTICAL PATH FOR RADIANT ENERGY GENERATED BY THE SECOND RADIANT ENERGY SOURCE, exit port 74*b* is provided in the scanner housing, as is lens 76 with isolation member 75.

In steps S11, ENERGIZE THE FIRST RADIANT ENERGY SOURCE, and step S12, OBTAIN A FOCUS CONDITION FOR BAR CODE USING RADIANT ENERGY IN THE FIRST OPTICAL PATH, the focus condition of FIGS. 2 or 3 is obtained by using the optical path defined as by mirrors 24, 26, 28 and 30.

In step S13, SCAN BAR CODE USING RADIANT ENERGY IN THE SECOND OPTICAL PATH WHILE IN FOCUS CONDITION, the bar code image, as illuminated by the output of LEDs 78 is conveyed to the CCD.

Figure 10:
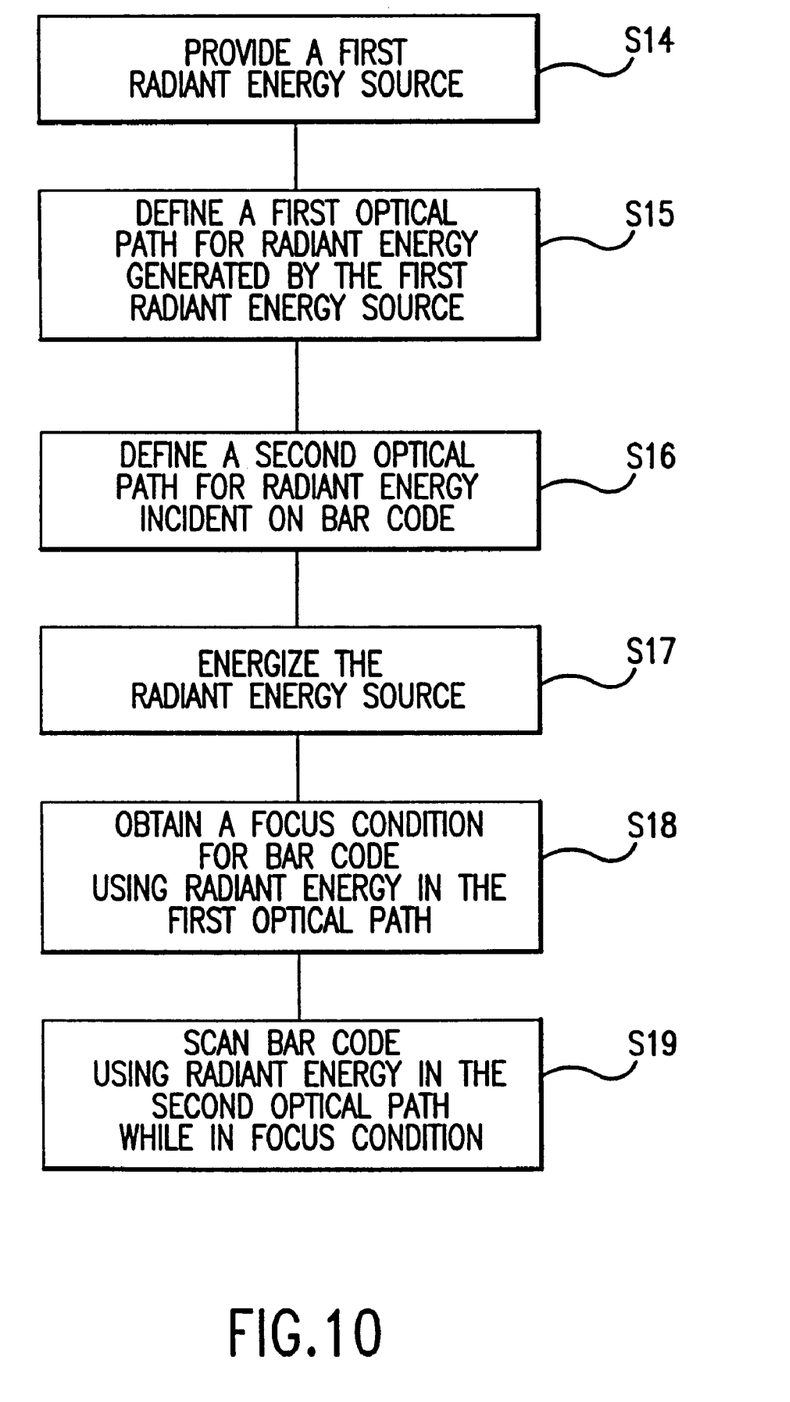
FIG. 10 is a flowchart of steps practiced in a third method afforded by the invention.

The flow chart of FIG. 10 will be seen to include steps S14 through S19, which correspond respectively to steps S7, S8 and S10 through S13, step 9 being omitted. This practice relies on ambient, environmental radiation incident on the bar code.

The radiant energy projection and collection arrangement of FIGS. 6 and 7 arranged the LED array and lens 76 in communication with a bar code through isolated optical funnels without intervening diffusion or reflection of the output beam. Preferred arrangements are now discussed in connection with FIGS. 11–14, in which showings of isolation structure are omitted, for simplicity, but may be included, as per isolation member 75 of FIGS. 6 and 7.

Figure 11:
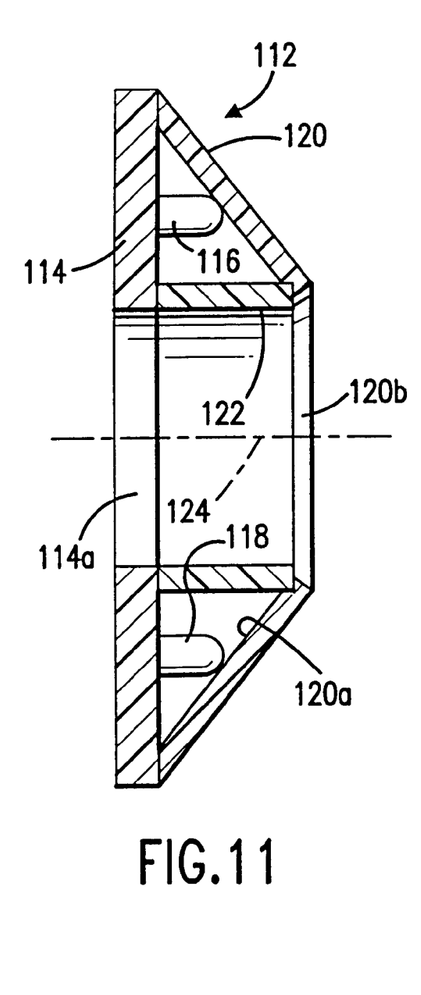
FIG. 11 is a central sectional view of a first embodiment of a bar code illumination projector for a scanner.

Referring to FIG. 11, an illumination projector or scanner optical funnel assembly 112 includes PCB 114 having central aperture 114*a*, with which lens 76 is placed in registry. LEDs 116 and 118 and others (not shown) are supported on PCB 114. Conical shroud member 120 is supported also by PCB 114 and includes central aperture 120*b* in registry with aperture 114*a*.

Interior surface 120*a* of conical shroud member 120 is treated to diffuse the LEDs' output light, for example, by zinc-white painting thereof. Diffuser ring 122 is secured between PCB 114 and conical member 120 and is disposed coaxially of optical axis 124, preferably being comprised of Delrin. High uniform illumination is achieved for the bar code upon energization of the LEDs.

Scanner optical funnel assembly 112 may be used with either a short focal length lens or an optical pinhole. The pinhole be an adjustable aperture formed as a liquid crystal plate.

Figure 12:
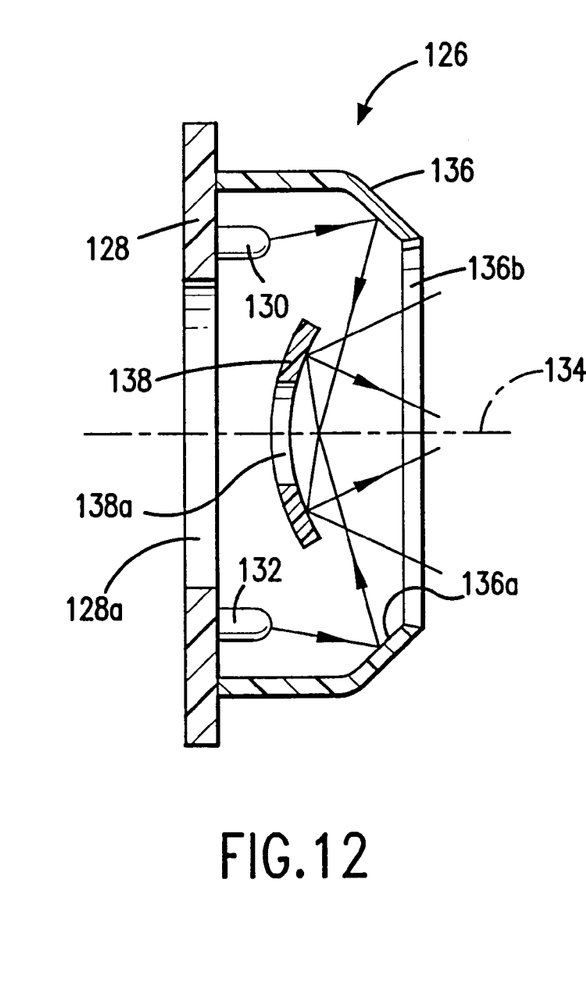
FIG. 12 is a central sectional view of a second embodiment of a bar code illumination projector for a scanner.

Referring to FIG. 12, scanner optical funnel assembly 126 includes PCB 128 having central aperture 128*a*, with which lens 76 is placed in registry. LEDs 130 and 132 and others (not shown) are supported on PCB 128 peripherally of optical axis 134. Shroud member 136 is supported also by PCB 128 and includes central aperture 136*b* in registry with aperture 128*a*. Interior surface 136*a* of shroud member 136 is treated to be positively reflective of incident light energy to reflect the same onto arcuate positively reflective mirror 138, the central portion is apertured as indicated at 138*a*. Bar code illuminating light is accordingly generated and applied to a bar code upon energization of LEDs 130, 132 and the unshown LEDs mounted therewith on PCB 128. Funnel assembly 126 is particularly suitable for long range bar code reading.

Figure 13:
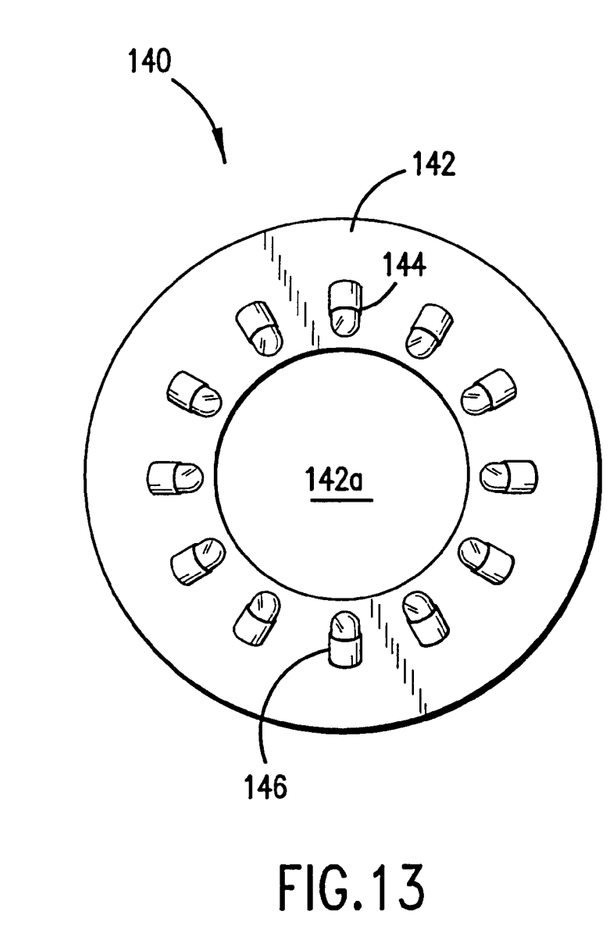
FIG. 13 is a front elevational view of third embodiment of a bar code illumination projector for a scanner.
Figure 14:
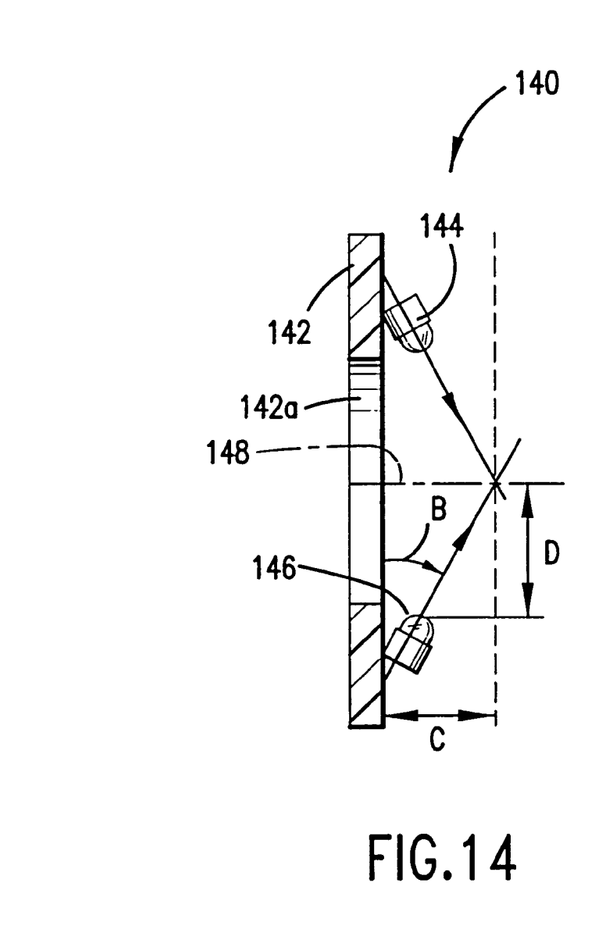
FIG. 14 is a central sectional view of the third embodiment of a bar code illumination projector for a scanner.

Turning to FIGS. 13 and 14, scanner optical funnel assembly 140 includes PCB 142 having central aperture 142*a*, with which lens 76 is placed in registry. LEDs 144 and 146 and others (FIG. 13) are supported on PCB 142, being surface-mounted at angle B and projecting light along respective transmission axes which intersect optical axis 148. Angle B defines a plane at which the projected light is focused at a distance C, the arc tangent of B being C/D, where D is the distance between an LED and optical axis 148.

Slider 86 (FIG. 5) is positioned as desired to control the energization levels of the LEDs of the optical funnel assemblies of FIGS. 11–14. In this connection, 2-D symbols printed or etched on different substrates have different reflection and are accordingly best scannable at different scanning energy levels.

The optical funnel assemblies of FIGS. 11–14 are particularly effective for reading miniature two-dimensional symbols, e.g., laser etched marks on IC chips. They nonetheless have reading regular size bar codes and nano-symbol compatibility.

Figure 15:
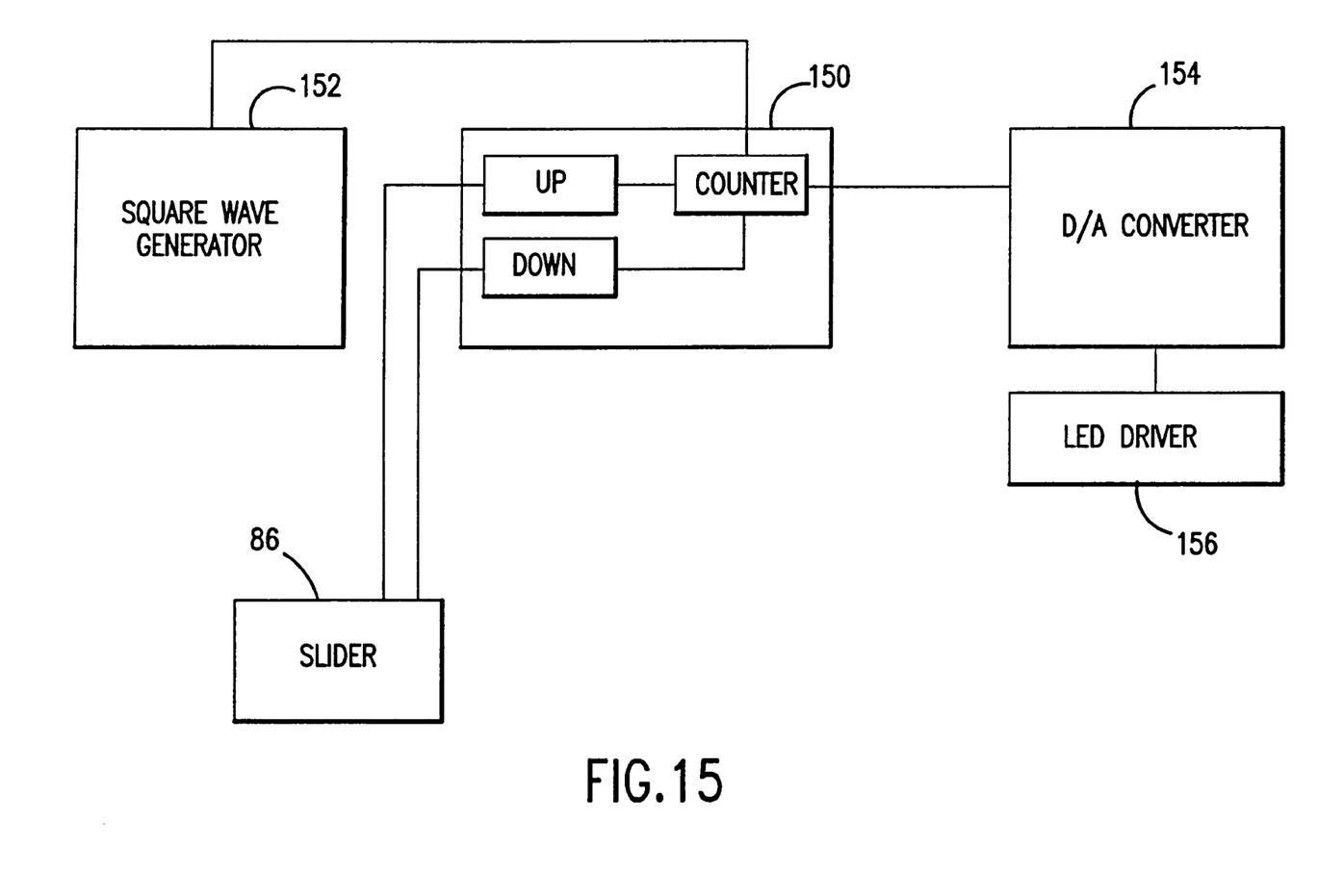
FIG. 15 is a functional block diagram of a system for control of illumination projection energy.

Turning to FIG. 15, slider 86 has a central (OFF) position and ON left and right positions, corresponding respectively with the UP and DOWN inputs to pulse counter 150. Depending on the user selection of the left and right positions for slider 86, the count state of counter 150 will be increased or decreased, based on input to the counter of the output of square wave generator 152. The output of the counter 150 is converted to analog form by D/A converter 154 and applied LED driver 156, which may be configured as an emitter-follower transistor stage, where the LEDs are connected to the transistor emitter and accordingly energized at a desired level. In this connection, the LEDs are responsive to voltage levels applied thereto to output light corresponding in intensities to the applied voltage levels.

Although the present invention has been described as aforesaid, it is not limited to such embodiments, but may also be applicable to more complex indicia scanning applications. It is conceivable that the present invention may also find application for use with various machine vision or optical character recognition applications in which information is derived from other types of indicia such as characters or from the surface characteristics of the article being scanned.

By way of summary and introduction to the ensuing claims, the invention will be seen to provide a support member having an aperture circumferentially disposed with respect to an optical axis of the scanner, a plurality of radiant energy sources supported by the support member in circumferential disposition with respect to the optical axis of the scanner and a shroud member disposed in circumscribing relation to the radiant energy sources and having a central aperture in circumferential disposition with respect to the optical axis of the scanner, the shroud member having interior surface adapted for optical modification of radiant energy generated by the radiant energy sources. In one embodiment, the interior surface of the shroud member is adapted to diffuse radiant energy generated by the radiant energy sources and the assembly includes a ring-shaped member disposed circumferentially of the optical axis of the scanner, radially interiorly of the radiant energy sources, and adapted to diffuse radiant energy generated by the radiant energy sources. In another embodiment, the interior surface of the shroud member is adapted to reflect radiant energy generated by the radiant energy sources and the assembly includes a radiant energy reflective member having an aperture circumferentially disposed with respect to the optical axis of the scanner and in optical communication with the reflective interior surface of the shroud member.

In another optical funnel assembly aspect, the invention provides a support member having an aperture circumferentially disposed with respect to an optical axis of the scanner and a plurality of radiant energy sources supported by the support member in circumferential disposition with respect to the optical axis of the scanner and having respective transmitting axes in intersecting relation to the optical axis of the scanner.

While several embodiments and variations of the present invention for an automatic focusing system and scanner are described in detail herein, it should be apparent that the disclosure and teachings of the present invention will suggest many alternative designs to those skilled in the art.

What is claimed is:

1. A bar code reader for reading information encoded in a bar code, said reader comprising:
    a) a gun-shaped housing;
    b) a focusing system located within said housing, said focusing system including:
        i) a single focusing source for producing a focusing beam; and
        ii) a beam modifying optics for modifying said focusing beam and producing a focusing pattern for assisting an operator in determining a proper relative position between said reader and said bar code;
    c) an illumination system located within said housing for flood illuminating said bar code;
    d) a detection system located within said housing and being optically isolated from said illumination system, said detection system for detecting an optical image of said illuminated bar code and converting said optical image into a corresponding set of electrical signals,
    e) a processor located within said housing for processing said set of electrical signals; and
    f) a trigger for enabling focusing system, said illumination system, said detection system and said processor.

2. The bar code reader of claim 1, wherein said focusing system assists in determination of a proper relative separation distance between said reader and said bar code.

3. The bar code reader of claim 2, wherein said focusing system assists in determination of a proper relative angular orientation between said reader and said bar code.

4. The bar code reader of claim 1, wherein said focusing source is an light emitting diode.

5. The bar code reader of claim 4, wherein said focusing source is a laser diode.

6. The bar code reader of claim 1, wherein said beam modifying optics modifies the focusing beam by segmenting it.

7. The bar code reader of claim 1, wherein said detecting system includes:
    a) a detector for detecting a focused optical image and converting said focused optical image into said set of electrical signals; and
    b) a collection optics for collecting said optical image and focusing said optical image onto said detector.

8. The bar code reader of claim 7, wherein said detector is a solid state imaging detector array.

9. The bar code reader of claim 8, wherein said solid state imaging detector array is a CCD detector array.

10. The bar code reader of claim 1, wherein said illumination system comprises a plurality of radiant energy sources.

11. The bar code reader of claim 10, wherein said plurality of radiant energy sources comprises light emitting diodes.

12. The bar code reader of claim 5, wherein said collection system includes:
    a) a detector for detecting a focused optical image and converting said focused optical image into said set of electrical signals; and
    b) a collection optics for collecting said optical image and focusing said optical image onto said detector.

13. The bar code reader of claim 12, wherein said detector is a solid state imaging detector array.

14. The bar code reader of claim 13, wherein said solid state imaging detector array is a CCD detector array.

15. The bar code reader of claim 14, wherein said illumination system comprises a plurality of radiant energy sources.

16. The bar code reader of claim 15, wherein said plurality of radiant energy sources comprises light emitting diodes.

* * * * *